United States Patent
Johnston et al.

(10) Patent No.: US 11,223,799 B1
(45) Date of Patent: Jan. 11, 2022

(54) EVENT NOTIFICATIONS FOR ONLINE MEETINGS

(71) Applicant: Cisco Technology, Inc., San Jose, CA (US)

(72) Inventors: Jay Kemper Johnston, Raleigh, NC (US); David C. White, Jr., St. Petersburg, FL (US); Magnus Mortensen, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/159,646

(22) Filed: Jan. 27, 2021

(51) Int. Cl.
*H04N 7/15* (2006.01)
*G06F 3/0484* (2013.01)
*G08B 25/00* (2006.01)
*H04L 29/06* (2006.01)

(52) U.S. Cl.
CPC ............ *H04N 7/15* (2013.01); *G06F 3/0484* (2013.01); *G08B 25/009* (2013.01); *H04L 65/403* (2013.01)

(58) Field of Classification Search
CPC .......... H04N 7/15; H04L 28/06; G08B 25/00; G08B 25/016; G06F 3/0484; H04W 4/90
USPC ............................................. 348/14.01–14.16
See application file for complete search history.

(56) References Cited

U.S. PATENT DOCUMENTS

| 6,292,542 | B1* | 9/2001 | Bilder | H04M 11/04 379/201.01 |
| 2008/0088428 | A1 | 4/2008 | Pitre et al. | |
| 2014/0057590 | A1 | 2/2014 | Romero | |
| 2014/0364081 | A1 | 12/2014 | Rauner | |
| 2015/0288797 | A1 | 10/2015 | Vincent | |
| 2019/0355233 | A1* | 11/2019 | Nepo | G08B 25/001 |
| 2020/0242718 | A1* | 7/2020 | Owens | G06Q 50/265 |

OTHER PUBLICATIONS

"Setting up Nomadic Emergency Service", retrieved on Nov. 12, 2020, Zoom Video Communications, Inc., 8 pages.

* cited by examiner

*Primary Examiner* — Melur Ramakrishnaiah
(74) *Attorney, Agent, or Firm* — Lee & Hayes, P.C.

(57) ABSTRACT

This disclosure describes techniques for providing notifications about events that occur during an online meeting. For instance, a system may establish an online meeting, such as a video conferencing meeting, for users. While in the meeting, a first user may view video of a second user and determine that the second user is experiencing an emergency event. As such, a user device of the first user may receive an input indicating that the emergency event is occurring with the second user. The system may receive the indication from the user device and verify that the emergency event is occurring. Additionally, the system may then send a notification to emergency personnel that indicates at least that the emergency event is occurring and a location of the second user. Furthermore, the system may send notification(s) to contact(s) associated with the second user that indicate at least that the emergency event is occurring.

20 Claims, 11 Drawing Sheets

EVENT NOTIFICATIONS FOR ONLINE MEETINGS

TECHNICAL FIELD

The present disclosure relates generally to providing event notifications associated with users participating in online meetings.

BACKGROUND

Video conferencing meetings allow users that are located at various locations to virtually meet with one another. For example, users are able to view videos of other users that are participating in a video conferencing meeting while socially interacting with such users. In some circumstances, a user participating in the video conferencing meeting may experience an emergency event, such as choking. Because the user is experiencing the emergency event, the user may be unable to call emergency personnel for help. Additionally, even if the user is able to call the emergency personnel, the user may still be unable to provide the necessary information that the emergency personnel need to help the user, such as the location of the user or the type of emergency event.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. In some cases, parentheticals are utilized after a reference number to distinguish like elements. Use of the reference number without the associated parenthetical is generic to the element. The systems depicted in the accompanying figures are not to scale and components within the figures may be depicted not to scale with each other.

DESCRIPTION OF EXAMPLE EMBODIMENTS

Overview

Figure 1:
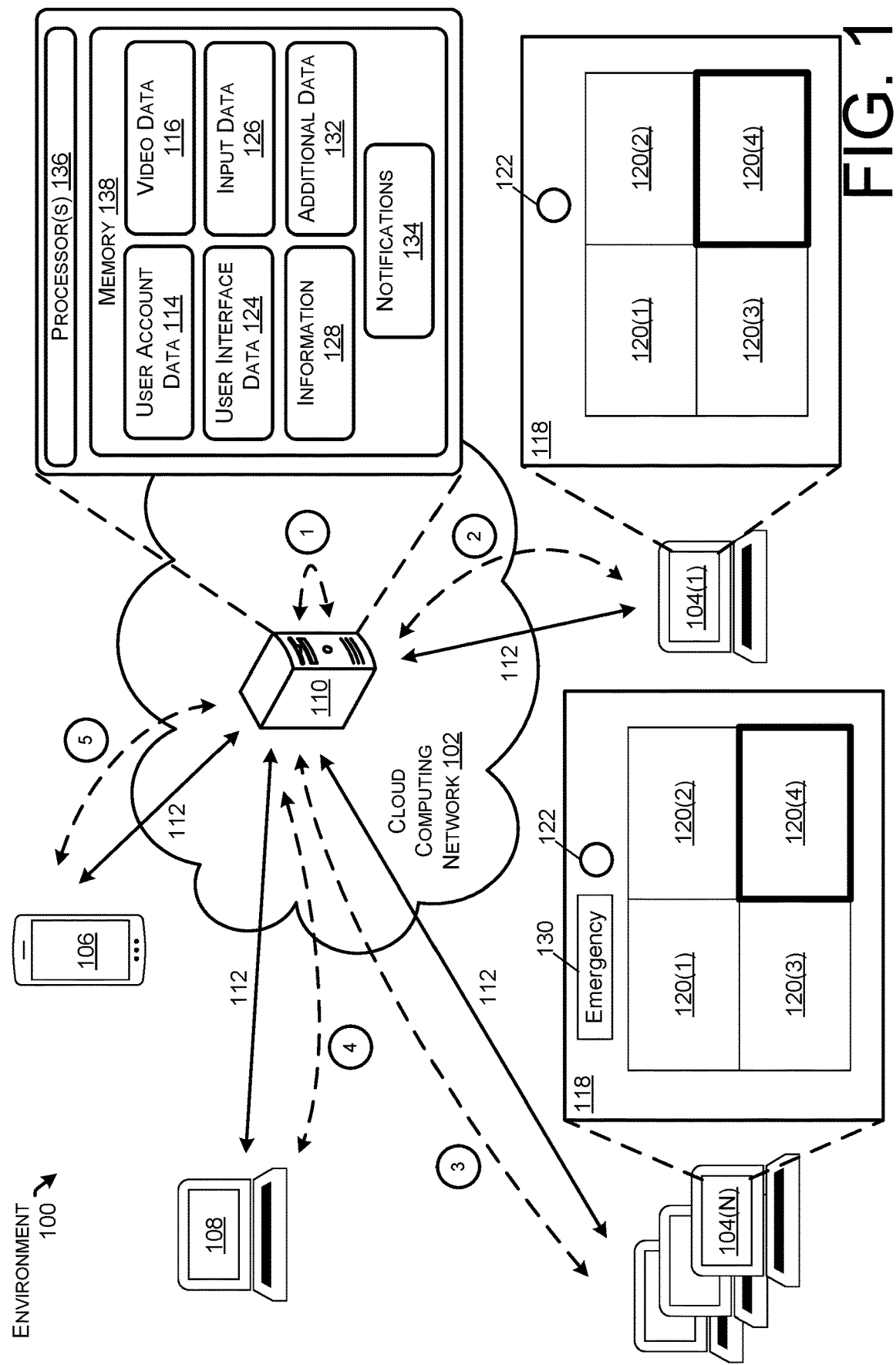
FIG. 1 illustrates a component diagram with an example environment in which event notifications may be employed, in accordance with the present concepts.

This disclosure describes, at least in part, a system that is configured to establish an online meeting, the online meeting being associated with at least a first user account and a second user account. The system is also configured to receive, from a first user device associated with the first user account, video data representing a video and then send the video data to a second user device associated with the second user account. Additionally, the system is configured to receive, from the second user device, an indication of an emergency event associated with the first user account. Based on the emergency event, the system is configured to determine a location associated with the first user account and send, to one or more computing devices, a notification that indicates that the emergency event is occurring and the location.

This disclosure also describes, at least in part, a method that includes establishing an online meeting, the online meeting being associated with at least a first user account and a second user account. The method also includes receiving, from a first user device associated with the first user account, video data representing a video and sending the video data to a second user device associated with the second user account. Additionally, the method includes receiving, from the second user device, an indication of an emergency event associated with the first user account. Based on the emergency event, the method includes determining contact information and sending, using the contact information, a notification that indicates the emergency event.

This disclosure further describes, at least in part, an electronic device that is configured to establish a connection with a system hosting an online meeting. The electronic device is also configured to display, using the display, a user interface associated with the online meeting, the user interface including at least an area for providing a video and an interface element for activating an emergency event. Additionally, the electronic device is configured to receive, from the system, video data representing the video and display the video using the area of the user interface. Furthermore, the electronic device is configured to receive an input selecting the interface element and, based at least in part on receiving the input, send, to the system, an indication of the emergency event.

Example Embodiments

This disclosure describes, at least in part, techniques for providing event notifications associated with users participating in online meetings. For instance, system(s) may establish an online meeting for users, where the users may be associated with user accounts. In some example, the online meeting includes a video conferencing meeting where video data and audio data is communicated between devices that establish connections to the video conferencing meeting. If, during the online meeting, a first user experiences an event, such as an emergency event, at least a second user included in the online meeting may be able to identify the emergency event using the video of the first user. The second user may then trigger an emergency response by, for example, selecting one or more interface elements included on a user interface that is provided by the second user's device. The emergency response may include the system(s) sending a first notification to emergency personnel, where the first notification includes at least a location of the first user and an indication that the emergency event is occurring. The emergency response may also include the system(s) sending second notification(s) to contact(s) of the first user, where the second notification(s) indicate at least that the emergency event is occurring.

For more detail, users may use devices to generate and/or update user accounts. A user account associated with a user may include information, such as, but not limited to, an identity of the user (e.g., name, username, etc.), a location associated with the user, contact information (e.g., phone number, email address, home address, etc.) for one or more contacts of the user, and/or any other type of information. In some examples, to generate and/or update the user account, the user may input the information into a device. The device may then send data representing the information to the system(s). The system(s) may use this data to generate a new user account if the user has not previously created a user account, or the system(s) may use this data to update the user account if the user has previously crated the user account.

The users may then use the user accounts to join an online meeting that is provided by the system(s). For example, each user may use the respective user account to log into an online meeting service provided by the system(s). The system(s) may then establish connections with the devices that attempt to join the online meeting. In some examples, the online meeting includes a video conferencing meeting where the system(s) communicate both video data and audio data between the devices that are connected to the online meeting. This way, each user is able to view videos of the other users while participating within the online meeting.

For example, the system(s) may generate a user interface that includes at least one or more areas (which are also referred to a "windows") for viewing one or more videos of other users. For instance, the user interface may include at least a first area that provides a first video of a first user, a second area that provides a second video of a second user, a third area that provides a third video of a third user, a fourth area that provides a fourth video of a fourth user, and/or so forth. The user interface may also include an interface element for indicating that an emergency event is occurring with respect to one of the users. As described herein, an interface element may include, but is not limited to, a button, an icon, an image, a video, and/or any other content that may be included on the user interface. An emergency event may include, but is not limited to, a user choking, a user having a heart attack, a user falling, a user getting sick, a fire occurring at a user's home, and/or any other event for which a user may require assistance, such as from emergency personnel. The system(s) may then provide the user interfaces to the devices that are connected to the online meeting.

In some circumstances, during the online meeting, a first user may experience an emergency event. While the first user is experiencing the emergency event, a second user participating in the online meeting may then view the video of the first user and identity that the first user is experiencing the emergency event. After identifying the emergency event, the second user may provide input that indicates that the first user is experiencing the emergency event. For example, the second device of the second user may receive a first input associated with selecting the first user (e.g., the first input may select the area of the user interface that is providing the video of the first user) and/or a second input selecting the interface element. In some instances, the second device may also receive an input indicating a type of emergency event that the first user is experiencing (e.g., choking). The system(s) may then receive, from the second device, data indicating that the first user is experiencing the emergency event and/or the type of emergency event that the first user is experiencing.

In some examples, the system(s) may then verify that the emergency event is occurring. For a first example, the system(s) may verify that the emergency event is occurring based on determining that a given number of users (e.g., one, two, five, ten, etc.) participating in the online meeting have indicated that the first user is experiencing the emergency event. For a second example, the system(s) may verify that the emergency event is occurring based on determining that a given percentage of the users (e.g., 25%, 50%, 75%, etc.) participating in the online meeting have indicated that the first user is experiencing the emergency event. In either of these examples, the other users participating in the online meeting may provide the indication similar to the second user described above. Still, for a third example, the system(s) may verify that the emergency event is occurring based on at least one of the other users (e.g., the host) participating in the online meeting not vetoing the emergency event for a threshold period of time. The threshold period of time may include, but is not limited to, two seconds, five seconds, ten seconds, and/or any other period of time. While these are just a couple example techniques for verifying an emergency event, in other examples, the system(s) may use one or more additional and/or alternative techniques to verify the emergency event.

The system(s) may then determine a location of the first user that is experiencing the emergency event. In some examples, the system(s) determine the location using the information that is associated with the first user account of the first user. For instance, and as discussed above, the information may include the location. In some examples, the system(s) determine the location using data received from one or more of the devices connected to the online meeting. For instance, the system(s) may send, to the devices, requests for the location of the first user. The system(s) may then receive, from at least one of the devices, data representing the location. In some examples, the system(s) determine the location by receiving, from the first device associated with the first user, location data representing the location. For instance, the location data may include Global Positioning Data representing the location of the first device. Still, in some examples, the system(s) may determine the location using other types of data (e.g., Internet Protocol (IP) data, Virtual Private Network (VPN) data, etc.) received from the first device. While these are just a couple of example techniques for determining the location of the first user, in other examples, the system(s) may use one or more additional and/or alternative techniques to determine the location.

The system(s) may also determine contact information for one or more contacts of the first user. In some examples, the system(s) determine the contact information using the information that is associated with the first user account. For instance, and as discussed above, the information may include contact information of the contact(s). In some examples, the system(s) determine the contact information using data received from one or more of the devices connected to the online meeting. For instance, the system(s) may send, to the devices, requests for the contact information of any of the first user's contact(s). The system(s) may then receive, from at least one of the devices, data representing the contact information associated with the contact(s). Still, in some examples, the system(s) may determine the contacts using a directory. For instance, the online meeting may be associated with a group, such as a company, business, school, class, team, and/or the like. As such, the system(s) may use a directory associated with the group to determine the contact information of the contact(s) for the first user. While these are just a couple of example techniques of determining the contact information for the contact(s), in other examples, the system(s) may use one or more additional and/or alternative techniques to determine the contact information.

The system(s) may then send one or more notifications associated with the emergency event. For a first example, the system(s) may generate a first notification that indicates the identity of the first user, that the emergency event is occurring, the type of the emergency event, the location of the first user, and/or other information. The system(s) may then send the first notification to one or more computing devices associated with emergency personnel. For a second example, the system(s) may generate a second notification that indicates the identity of the first user, that the emergency event is occurring, the type of the emergency event, the location of the first user, and/or other information. The system(s) may then use the contact information to send the second notification to the contact(s) associated with the first user. In some examples, the system(s) may continue to receive updates associated with the emergency event and send new notification(s) that include information about the received updates.

In some examples, the system(s) may perform one or more additional processes based on determining that the emergency event is occurring. For a first example, the system(s) may automatically connect emergency personnel into the online meeting. For instance, the system(s) may begin to receive video data from a computing device associated with the emergency personnel. The system(s) may then begin to send the video data to at least the first device associated with the first user. This way, the emergency personnel is able to provide immediate help to the first user within the online meetings. In some examples, the emergency personnel are associated with the group that is holding the online meeting. For example, if the group includes a company, then the emergency personnel may include an emergency response team associated with the company. In some examples, the system(s) may automatically disconnect one or more of the other users from the online meeting. This may help provide privacy for the first user as the emergency personnel are helping the first user through the emergency event.

For a second example, the system(s) may cause the first device of the first user to output an alert. In some examples, to cause outputting of the alert, the system(s) may send, to the first device, image data representing one or more images indicating that the emergency event is occurring. The first device may then receive the image data and, in response, display the one or more images. Additionally, or alternatively, in some examples, to cause outputting of the alert, the system(s) may send, to the first device, audio data representing sound indicating that the emergency event is occurring. The first device may then receive the audio data and, in response, output the sound. This way, other users that are located proximate to the user, but are not participating in the online meeting, may still be notified about the emergency event.

For a third example, the system(s) may cause one or more other devices that are located proximate to the first user to output an alert. For instance, the system(s) may analyze location data representing locations of other devices in order to identify one or more devices that are located proximate to the first device. As described herein, a device may be located proximate to another device when the device is located within a threshold distance to the other devices (e.g., one meter, five meters, fifty meters, etc.), when the device is located within a similar environment (e.g., house, business, company, etc.) as the other device, and/or the like. Similar to the first device above, the system(s) may send image data and/or audio data representing the alert. However, when sending the alert to the one or more proximate devices, the alert may include additional information, such as the location of the first user. This way, other users that are again located proximate to the user, but are not participating in the online meeting, may still be notified about the emergency event.

Still, for a fourth example, the system(s) may delegate one or more duties for one or more other users included in the online meeting. For example, a user included in the online meeting, such as the host of the online meeting, may input duties into a device. The system(s) may then receive, from the device, data representing the duties for the other users. As described herein, a duty may include, but is not limited to, contacting the emergency personnel, contacting the contact(s) associated with the first user, attempting to obtain additional information from the first user about the emergency event, visiting and/or checking on the first user, and/or any other duty that may help improve the emergency event for the first user. The system(s) may then send, to other devices connected to the online meeting, data representing the duties. This way, each of the users participating in the online meeting will be notified of his or her respective duty. This may increase the other users' abilities to help the first user that is experiencing the emergency event.

By performing the processes and techniques described above, the system(s) may able to improve the safety of participants within online meetings. For instance, and using the examples above, if the first user is experiencing the emergency event and not able to contact emergency personnel, one or more other users participating in the online meeting are able to view the video depicting the first user and notify the system(s). The system(s) are then able to take the necessary steps, such as notifying the emergency personnel and/or notifying the contact(s) of the first user, with information that is important to help the first user. Additionally, by performing the processes and techniques described above, the system(s) are able to verify that an emergency event is actually occurring before taking additional steps. For instance, and as discussed above, the system(s) may refrain from notifying the emergency personnel and/or the contact(s) until the system(s) verify that the emergency event is actually occurring using one or more additional users participating in the online meeting.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates an example environment 100 in accordance with the present emergency notification concepts. The example environment 100 may include a cloud computing network 102 (e.g., network), user devices 104(1)-(N) (also referred to as "user devices 104"), a contact device 106, a personnel device 108, and/or one or more conferencing devices 110. Parentheticals are utilized after a reference number to distinguish like elements. Use of the reference number without the associated parenthetical is generic to the element. For example, FIG. 1 includes multiple instances of a user device 104, including the user device 104(1) and the user device 104(N). Additionally, although the example of FIG. 1 illustrates the user devices 104 as including desktop computers, the contact device 106 as including a mobile phone, and the personnel device 108 as including a desktop computer, in other examples, the user devices 104, the contact device 106, and/or the personnel device 108 may include any other type of device.

In some examples, the environment 100 comprises a data center or cloud-computing network comprising servers and other network components (e.g., routers, switches, etc.) stored across multiple data centers located across geographic areas. In these instances, the cloud-computing environment may be a distributed network through which devices interact with service provided by the cloud computing network. The cloud computing network may provide on-demand availability of computing system resources, such as data storage, computing power (e.g., CPU, GPU, etc.), networking, databases, etc., without direct active management by users. In some examples, the cloud computing network may be managed and maintained by a service provider such that users do not have to invest in and maintain the computing infrastructure for their computing resource needs.

The user devices 104, the contact device 106, the personnel device 108, and/or the conferencing device(s) 110 may be communicatively coupled among one another and/or to various other devices via cloud computing network 102. Within the example environment 100, the user devices 104, the contact device 106, the personnel device 108, and/or the conferencing device(s) 110, and/or other devices, may exchange communications (e.g., packets) via a network connection(s) to cloud computing network 102, indicated by double arrows 112. For instance, network connections 112 may be transport control protocol (TCP) network connections or any network connection (e.g., information-centric networking (ICN)) that enables the devices to exchange packets with other devices via cloud computing network 102. The network connections 112 represent, for example, a data path between each of the user devices 104, the contact device 106, and/or the personnel device 108 and the conferencing device(s) 110.

For example, a user device 104 may be a computer, laptop, mobile device, tablet, etc., while the conferencing device(s) 110 may be configured to provide data and/or network services, such as online meeting services, to the user device 104. The conferencing device(s) 110 may or may not be a producer, a point of generation and/or origination of the data. For instance, the data may originate elsewhere for the conferencing device(s) 110 to be able to provide to the user devices 104, the contact device 106, and/or the personnel device 108. Additionally, or alternatively, the data may pass through other network devices (e.g., router, switch) on a path from the conferencing device(s) 110 to the user devices 104, the contact device 106, and/or the personnel device 108. It should be appreciated that the term "network connection" may also be referred to as a "network path." The use of a cloud computing network in this example is not meant to be limiting. Other types of networks are contemplated in accordance with the emergency notification concepts described herein.

The conferencing device(s) 110 may initially allow users to create user accounts for online meetings, where the user accounts are represented by user account data 114. For example, a user device 104 may initially receive, from a user, one or more inputs representing information for the user account. As described above, the information may include, but is not limited to, an identity of the user (e.g., name, username, etc.), a location associated with the user, contact information (e.g., phone numbers, email address, home addresses, business address, etc.) for one or more contacts of the user, and/or any other type of information. The electronic device(s) 110 may then receive data representing the information from the user device 104 and use the information to create the user account. After creating the user account, the user may then use the user device 104 to update the information associated with the user account.

For example, when joining an online meeting, the user device 104 may receive one or more inputs representing updated information for the user account, such as a new location associated with the user and/or new contact information for contact(s) of the user. In some examples, before receiving the input(s), the conferencing device(s) 110 may send a request to the user device 104 for the updated information. The conferencing device(s) 110 may then receive, from the user device 104, data representing the updated information and update the user account using the updated information. This way, and as described in more detail below, the conferencing device(s) 110 may update the user account with the current location of the user and/or the current contact information for contact(s) of the user just in case an emergency event occurs.

At "Step 1," the conferencing device(s) 110 may initially create an online meeting for the users of the user devices 104. For instance, the conferencing device(s) 110 may establish a respective communication session with each of the user devices 104. The conferencing device(s) 110 may then connect the communication sessions for the user devices 104 in order to create the online meeting (e.g., a group communication session). In some examples, the online meeting includes a video conferencing meeting. For example, while connected to the online meeting, the conferencing device(s) 110 may be communicating content data, such as video data 116 and audio data, between the user devices 104. In such examples, the videos represented by the video data 116 may depict the users associated with the user devices 104. Additionally, the sound represented by the audio data may include speech from the users.

For example, and at Step 2," the conferencing device(s) 110 may communicate with the user device 104(1). For instance, the communication at Step 2 may include the conferencing device(s) 110 generating a user interface 118 associated with the online meeting. For instance, the user interface 118 may include different areas 120(1)-(N) (also referred to as "areas 120") for providing the videos depicting the other users included in the online meeting. The user device 118 may further include an interface element 122 for indicating that a triggering event, such as an emergency event, is occurring with a user included in the online meeting. Based on generating the user interface 118, the conferencing device(s) 110 may send, to at least the user device 104(1), user interface data 124 representing the user interface 118. Using the user interface data 124, the user device 104(1) may display the user interface 118 to the user. The conferencing device(s) 110 may then continue to send the content data, such as the video data 116, to the user device 104 in order to stream the videos of the other users. Additionally, the conferencing device(s) 110 may perform similar processes to provide similar user interfaces 118 to each of the other user device 104.

While displaying the user interface 118, the user device 104(1) may receive one or more inputs indicating that an emergency event is occurring with one of the users. For example, the user device 104(1) may receive a first input selecting the area 120(4) of the user interface 118 that is associated with the user experiencing the emergency event (where the first input is illustrated by the area 120(4) including a thick border). For instance, the area 120(4) may be providing the video depicting the user. The user device 104(1) may also receive a second input selecting the interface element 122. Based on the second input, the communication at Step 2 may include the user device 104(1) sending, to the conferencing device(s) 110, input data 126 representing the first input and the second input. The conferencing device(s) 110 may then use the input data 126 to determine that the emergency event is occurring.

In some examples, the user device 104(1) may also receive one or more additional inputs indicating information 128 associated with the emergency event. For example, the information 128 may include, but is not limited to, the type of emergency event, the location of the user that is experiencing the emergency event, contact information for contact(s) of the user, and/or any other information. In examples wherein the user device 104(1) receives the additional information 128, the communication at Step 2 may also include the user device 104(1) sending the additional information 128 to the conferencing device(s) 110.

At "Step 3," the conferencing device(s) 110 may communicate with the other user devices 104(N). For instance, the communication at Step 3 may include the conferencing device(s) 110 sending, to the other user devices 104(N), data indicating that the user of the user device 104(1) has indicated that the emergency event is occurring. As such, in some examples, and as shown by the example of FIG. 1, the user interface 118 being displayed by the other user devices 104(N) may provide an indication 130 that the emergency event has been triggered. The user interface 118 being displayed by the other user devices 104(N) may also indicate which user is experiencing the emergency event. For instance, and in the example of FIG. 1, the area 120(4) of the user interface 118 again includes a thick border that identifies the user. However, in other examples, the user interface 118 may indicate the user using additional and/or alternative techniques.

In some examples, one or more of the users associated with the other user devices 104(N) may then verify whether the emergency event is actually occurring. For example, the conferencing device(s) 110 may send, to the other user devices 104(N), requests to verify whether the emergency event is actually occurring. Based on the requests, one or more of the other user devices 104(N) may receive input(s) indicating that the emergency event is occurring and/or indicating that the emergency event is not occurring. The communication at Step 3 may then include one or more other devices 104(N) sending, to the conferencing device(s) 110, input data 126 representing the input(s). Based on receiving the input data 126, the conferencing device(s) 110 may verify whether the emergency event is occurring.

In some examples, the conferencing device(s) 110 may determine that the emergency event is occurring based on a threshold number of other users indicating that the emergency event is occurring. In some examples, the conferencing device(s) 110 may determine that the emergency event is occurring based on a threshold percentage of other users indicating that the emergency event is occurring. Still, in some examples, the conferencing device(s) 110 may determine that the emergency event is occurring based on a host of the online meeting indicating that the emergency event is occurring. In such examples, the host may be associated with the user account that created the online meeting for the users.

In the alternative, in some examples, the conferencing device(s) 110 may determine that the emergency event is not occurring based on a threshold number of other users indicating that the emergency event is not occurring. In some examples, the conferencing device(s) 110 may determine that the emergency event is not occurring based on a threshold percentage of other users indicating that the emergency event is not occurring. Still, in some examples, the conferencing device(s) 110 may determine that the emergency event is not occurring based on the host indicating that the emergency event is not occurring. In the example of FIG. 1, the conferencing device(s) 110 may use the input data 126 received from the other devices 104(N) to verify that the emergency event is actually occurring.

In some examples, the other user devices 104(N) may also receive one or more additional inputs indicating information 128 associated with the emergency event. As described above, the information 128 may include, but is not limited to, the type of emergency event, the location of the user that is experiencing the emergency event, contact information for the contact(s) of the user, and/or any other information. In some examples, the conferencing device(s) 110 may send requests to the other user devices 104(N) for the additional information 128. In such examples, and based on the requests, the user interfaces 118 may display interface elements for inputting the additional information 128. In examples wherein the other user devices 104(N) receive the additional information 128, the communication at Step 3 may also include the other user devices 104(N) sending data representing the information 128 to the conferencing device(s) 110.

Based on verifying the emergency event, the conferencing device(s) 110 may then determine the location of the user that is experiencing the emergency event. In some examples, the conferencing device(s) 110 determine the location of the user using the user account associated with the user. For instance, and as discussed above, the user account may include information indicating the location. In some examples, the conferencing device(s) 110 determine the location of the user using information 128 received from the user devices 104. For instance, and as again discussed above, the information 128 may indicate the location as input by one or more of the other users. Still, in some examples, the conferencing device(s) 110 may determine the location using additional data 132 received from the user device 104(N) of the user that is experiencing the emergency event.

For a first example, the additional data 132 may include location data (e.g., GPS data) generated by the user device 104(N). As such, the conferencing device(s) 110 may be able to analyze the location data in order to determine the location of the user device 104(N) and thus, the location of the user. For a second example, the additional data 132 may include IP data associated with the user device 104(N). As such, the conferencing device(s) 110 may be able to analyze the IP data in order to determine the location of the user device 104(N) and thus, the location of the user. Still, for a third example, the conferencing device(s) 110 may be able to analyze the additional data 132 and determine, based on the analysis, that the user is associated with another user device, such as a mobile phone. As such, the conferencing device(s) 110 may receive location data (e.g., GPS data) from the other user device (e.g., based on initially sending a request to the other user device). The conferencing device(s) 110 may then analyze the location data in order to determine the location of the other user device and thus, the location of the user.

In some examples, the other users (e.g., the users not experiencing the emergency event) may indicate the location of the user that is experiencing the emergency event. For a first example, the conferencing device(s) 110 may send, to a user device 104 associated with another user, a request for the location of the user. The other user may then use the user device 104 to input the location and send, to the conferencing device(s) 110, additional data 132 representing the location. For a second example, the conferencing device(s) 110 may send, to a user device 104 associated with another user, a request to verify the location of the user. The other user may then use the user device 104 to verify that the location is accurate and send, to the conferencing device(s) 110, additional data 132 indicating that the location is correct.

Additionally, based on verifying the emergency event, the conferencing device(s) 110 may determine contact information for contact(s) of the user. In some examples, the conferencing device(s) 110 determine the contact information for the contact(s) using the user account associated with the user. For instance, and as discussed above, the user account may include information indicating the contact information. In some examples, the conferencing device(s) 110 determine the contact information for the contact(s) using information 128 received from the other user devices 104. For instance, and as discussed above, the information 128 may indicate the contact information as input by one or more of the other users. Still, in some examples, the conferencing device(s) 110 may analyze a directory in order to determine the contact information for the contact(s).

At "Step 4," the conferencing device(s) 110 may communicate with the personnel device 108. For instance, the communication at Step 4 may include the conferencing device(s) 110 sending, to the personnel device 108, a notification 134 associated with the emergency event. The personnel device 108 may be associated with one or more emergency services, such as, but not limited to, police, firefighters, medical personnel, and/or any other emergency service that is able to help during an emergency event. The notification 134 may indicate the identity of the user, the location of the user, the type of the emergency event, the length of time that the emergency event has been occurring, and/or any other information that the emergency personnel may use to help the user. In some examples, if the conferencing device(s) 110 receive updated information 128 for the emergency event, such as an updated location of the user, then the conferencing device(s) 110 may send, to the personnel device 108, additional notification(s) 134 indicating the updated information 128.

At "Step 5," the conferencing device(s) 110 may communicate with the contact device 106. For instance, the communication at Step 4 may include the conferencing device(s) 110 sending, to the contact device 106, a notification 134 associated with the emergency event. In some instances, the conferencing device(s) 110 send the notification 134 using the contact information of the contact(s). For instance, the contact information may include the phone number associated with the contact device 106. The notification 134 may indicate the identity of the user, the location of the user, the type of the emergency event, the length of time that the emergency event has been occurring, and/or any other information associated with the emergency event. In some examples, if the conferencing device(s) 110 receive updated information 128 for the emergency event, such as an updated location of the user, then the conferencing device(s) 110 may send, to the contact device 106, additional notification(s) 134 indicating the updated information 128.

While the example of FIG. 1 illustrates the conferencing device(s) 110 communicating with one personnel device 108 at Step 4 and one contact device 106 at Step 5, in other examples, the conferencing device(s) 110 may communicate with more than one personnel device 108 and/or more than one contact device 106. Additionally, in some examples, the conferencing device(s) 110 may send notification(s) 134 to user devices 104 that are not included in the online meeting. For example, the conferencing device(s) 110 may determine that user device(s) 104 are not connected to the online meeting, but that the user device(s) 104 are located proximate to the user device 104 of the user that is experiencing the emergency event. As such, the conferencing device(s) 110 may send, to the user device(s) 104, notification(s) 134 that indicate the identity of the user, the location of the user, the type of the emergency event, the length of time that the emergency event has been occurring, and/or any other information. This way, user(s) of the user device(s) 104 may also provide help to the user that is experiencing the emergency event.

As further illustrated in the example of FIG. 1, the conferencing device(s) 110 include processor(s) 136 and memory 138. As used herein, a processor may include multiple processors and/or a processor having multiple cores. Further, the processors may comprise one or more cores of different types. For example, the processors may include application processor units, graphic processing units, and so forth. In one instance, the processor may comprise a microcontroller and/or a microprocessor. The processor(s) may include a graphics processing unit (GPU), a microprocessor, a digital signal processor or other processing units or components known in the art. Alternatively, or in addition, the functionally described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, processor(s) may possess its own local memory, which also may store program components, program data, and/or one or more operating systems.

Memory may include volatile and nonvolatile memory, removable and non-removable media implemented in any method or technology for storage of information, such as computer-readable instructions, data structures, program component, or other data. The memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device. The memory may be implemented as computer-readable storage media ("CRSM"), which may be any available physical media accessible by the processor(s) to execute instructions stored on the memory. In one basic instance, CRSM may include random access memory ("RAM") and Flash memory. In other instances, CRSM may include, but is not limited to, read-only memory ("ROM"), electrically erasable programmable read-only memory ("EEPROM"), or any other tangible medium which can be used to store the desired information and which can be accessed by the processor(s).

Figure 2:
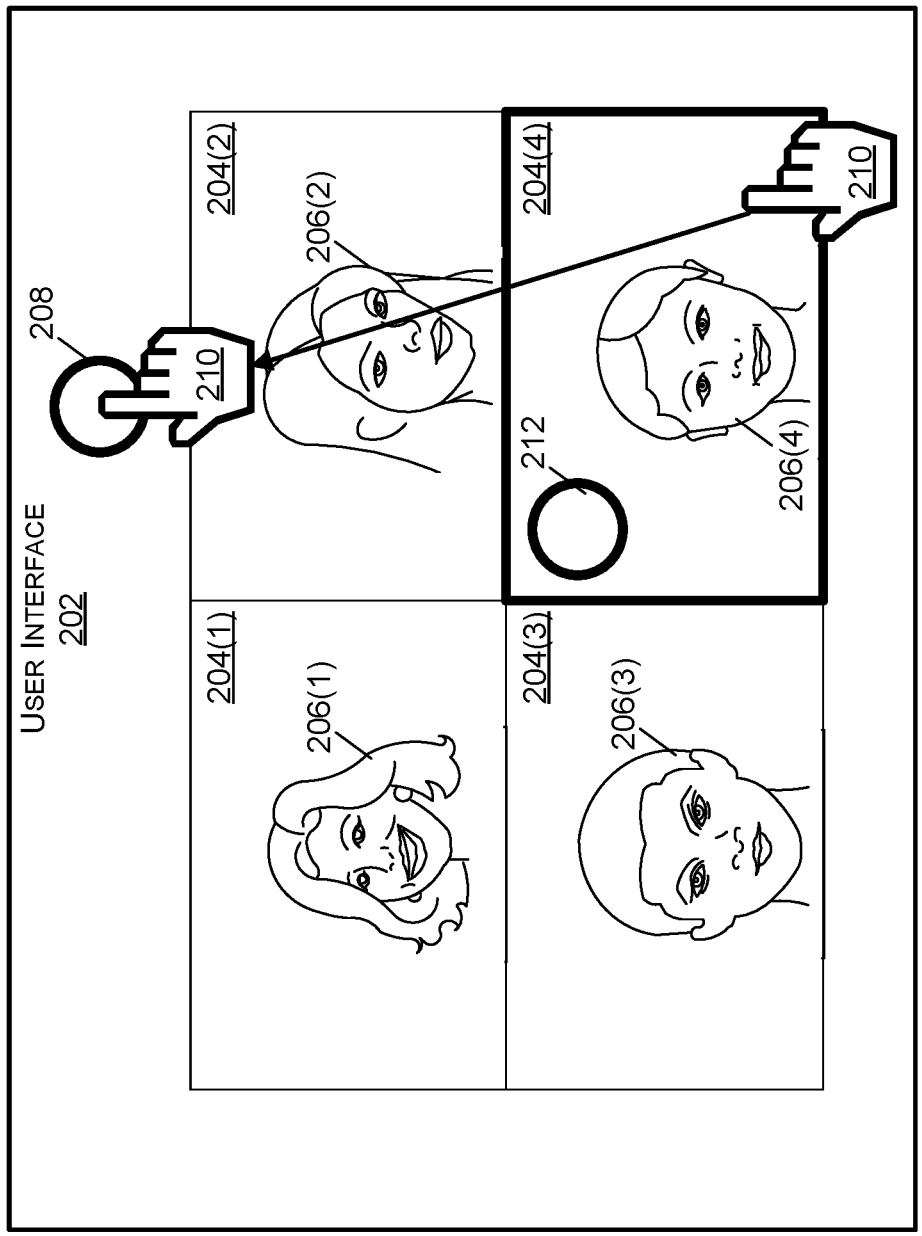
FIG. 2 illustrates an example user interface for indicating that a user is experiencing an event, in accordance with the present concepts.

FIG. 2 illustrates an example user interface 202 for indicating that a user is experiencing an emergency event, in accordance with the present concepts. For instance, and as shown, the user interface 202 is associated with a video conferencing meeting and includes areas 204(1)-(4) (also referred as "areas 204") assigned to different users 206(1)-(4) (also referred to as "users 206") of the video conferencing meeting. For example, the first area 204(1) is providing a first video depicting the first user 206(1), the second area 204(2) is providing a second video depicting the second user 206(2), the third area 204(3) is providing a third video depicting the third user 206(3), and the fourth area 204(4) is providing a fourth video depicting the fourth user 206(4). While the example of FIG. 2 illustrates four areas 204 providing four videos, in other examples, the user interface 202 may include any number of areas providing any number of videos depicting any number of users.

As further shown in the example of FIG. 2, the user interface 202 includes an interface element 208 for indicating that an emergency event is occurring. For example, and in the example of FIG. 2, a user 210 may initially provide an input selecting the fourth area 204(4) associated with the fourth user 206(4) who the user 210 believes is experiencing the emergency event. As shown, the user interface 202 may then indicate that the fourth area 204(4) was selected, such as by adding a thick border to the fourth area 204(4) or adding an indicator 212 to the fourth area 204(4). The user 210 may then provide an input selecting the interface element 208. Based on these two inputs, the conferencing device(s) 110 may receive input data indicating that the fourth user 206(4) may be experiencing the emergency event.

Figure 3:
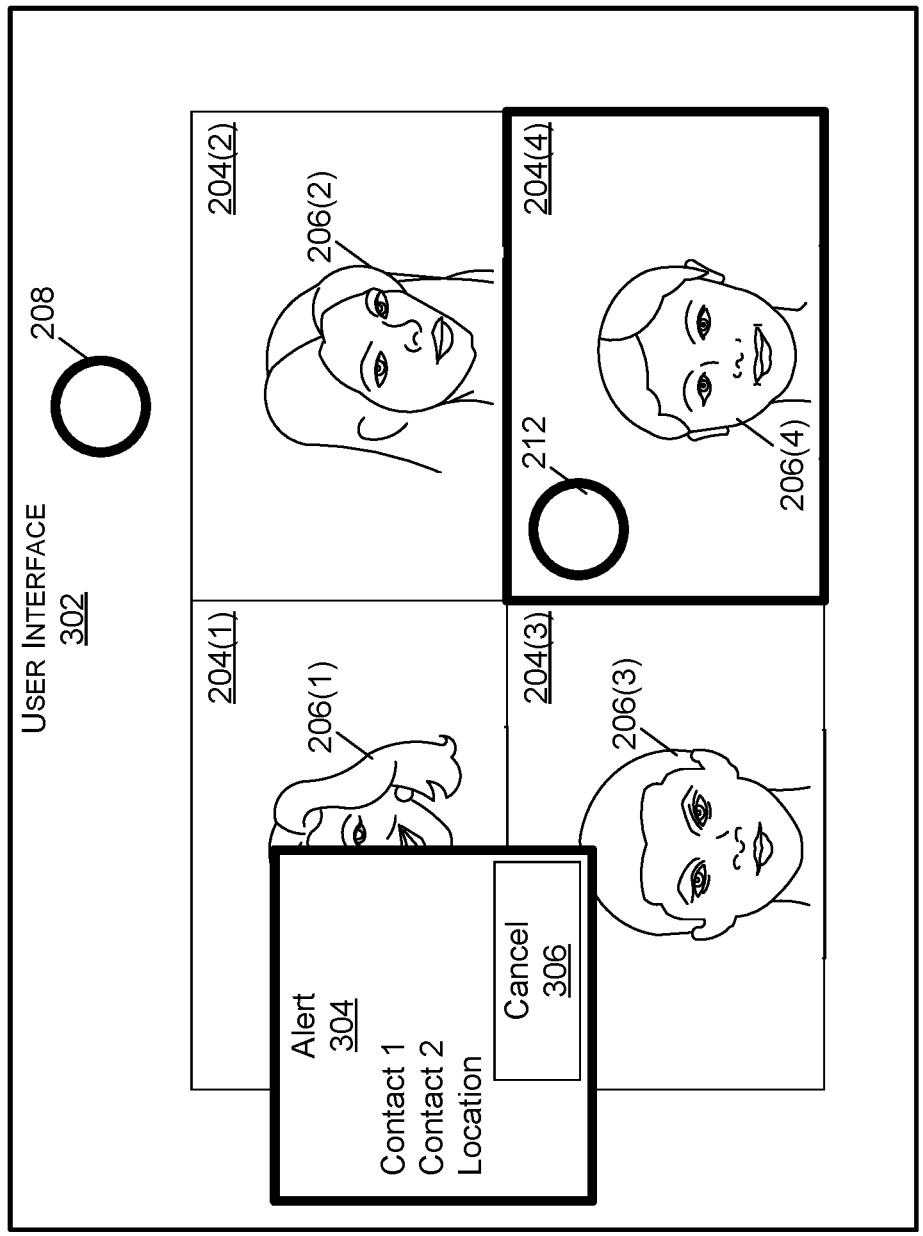
FIG. 3 illustrates an example user interface for alerting other users that a user is experiencing an event, in accordance with the present concepts.

FIG. 3 illustrates an example user interface 302 for alerting other users that the fourth user 206(4) is experiencing the emergency event, in accordance with the present concepts. For instance, the user interface 302 may be similar to the user interface 202, however, the user interface 302 further includes an alert 304 associated with the emergency event. The alert 304 includes information about the emergency event, such as a first contact that is being notified by the conferencing device(s) 110 (e.g., emergency personnel), a second contact that is being notified by the conferencing device(s) 110 (e.g., a family member), and a location of the fourth user 206(4). However, in other examples, the alert 304 may include additional and/or alternative information.

As further shown in the example of FIG. 3, the alert 304 includes an interface element 306 for cancelling the alert 304. For instance, if the user associated with the user interface 302 believes that the fourth user 206(4) is not experiencing the emergency event, then the user may select the interface element 306 in order to attempt to cancel the alert 304. In some examples, a threshold number of users and/or a threshold percentage of users may need to cancel the alert 304 in order for the conferencing device(s) 110 to cancel the alert 304. In other examples, a specific user, such as a host of the video conference meeting or the fourth user 206(4), needs to cancel the alert 304 in order for the conferencing device(s) 110 to cancel the alert 304.

Figure 4:
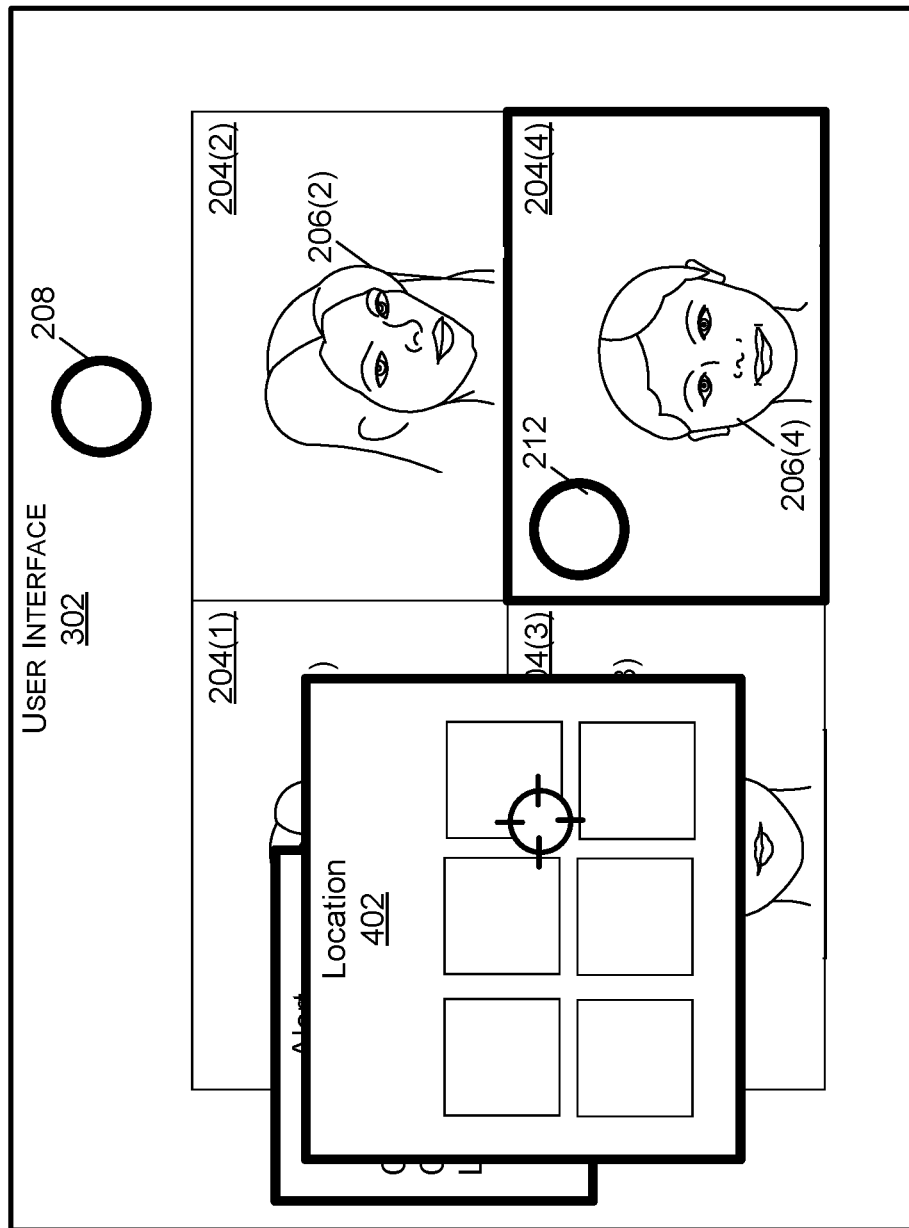
FIG. 4 illustrates an example user interface for indicating a location of a user experiencing an event, in accordance with the present concepts.

FIG. 4 illustrates an example of the user interface 302 now providing an interface element 402 for indicating a location of the fourth user 206(4) experiencing the emergency event, in accordance with the present concepts. For instance, the user interface 302 now includes the interface element 402 for inputting the location of the fourth user 206(4). In the example of FIG. 4, the interface element 402 includes a map for which the user is able to specify the location. However, in other examples, the interface element 402 may allow for other techniques to input the location, such as allowing the user to type the location. Once the user inputs the location, the conferencing device(s) 110 may receive, from the user device, data representing the inputted location.

Figure 5:
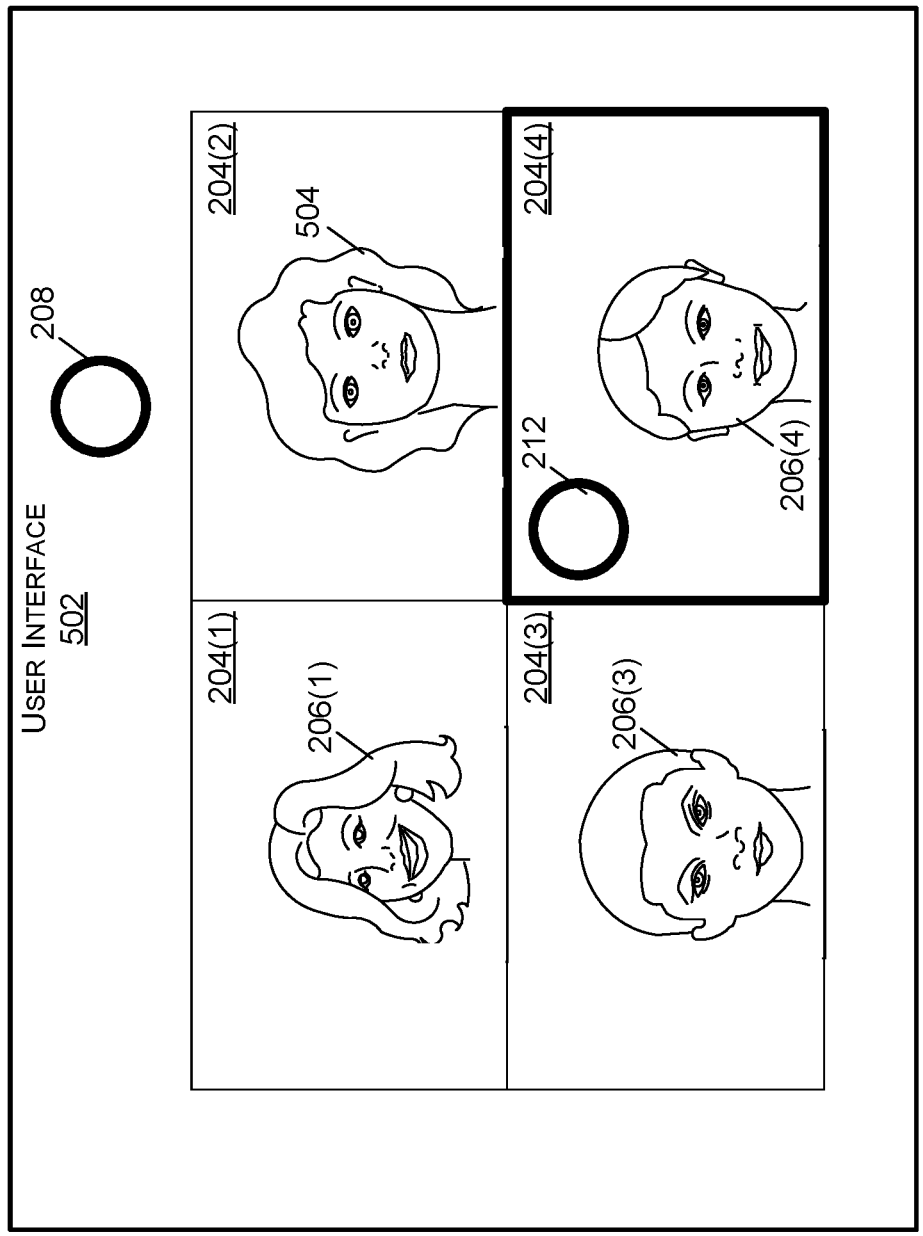
FIG. 5 illustrates an example user interface that includes personnel to help a user experiencing an event, in accordance with present concepts.

FIG. 5 illustrates an example user interface 502 that includes personnel to help the fourth user 204(4) experiencing the emergency event, in accordance with present concepts. For instance, the user interface 502 may be similar to the user interface 202, however, the user interface 502 now includes a video depicting a personnel member 504 at the second portion 204(2) of the user interface 502. The personnel member 504 may then be able to talk to the fourth user 206(4) in order to help the fourth user 206(4) through the emergency event. In some examples, such as for privacy reasons, the conferencing device(s) 110 may remove other users from the video conferencing meeting while the personnel member 504 is talking to the fourth user 206(4).

Figure 6:
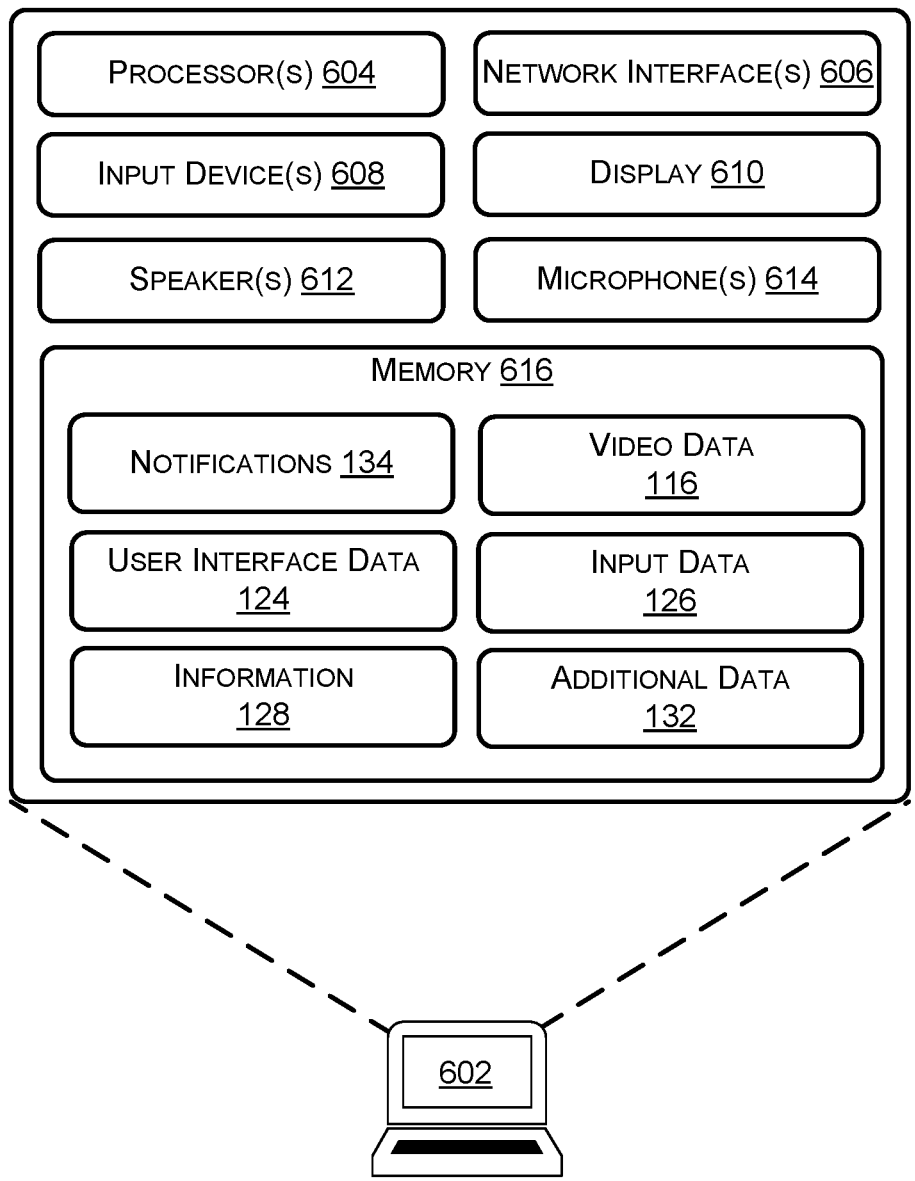
FIG. 6 illustrates example components of a user device, in accordance with present concepts.

FIG. 6 illustrates example components of a user device 602, in accordance with present concepts. The user device 602 may include, and/or represent, one or more of the user devices 104. As shown, the user device 602 includes processor(s) 604, network interface(s) 606, input device(s) 608, a display 610, speaker(s) 612, microphone(s) 614, and memory 614. In some examples, the user device 602 may include one or more additional components not illustrated in the example of FIG. 6. Additionally, or alternatively, in some examples, the user device 602 may not include one or more of the input device(s) 608, the speaker(s) 612, or the microphone(s) 614.

Figure 7:
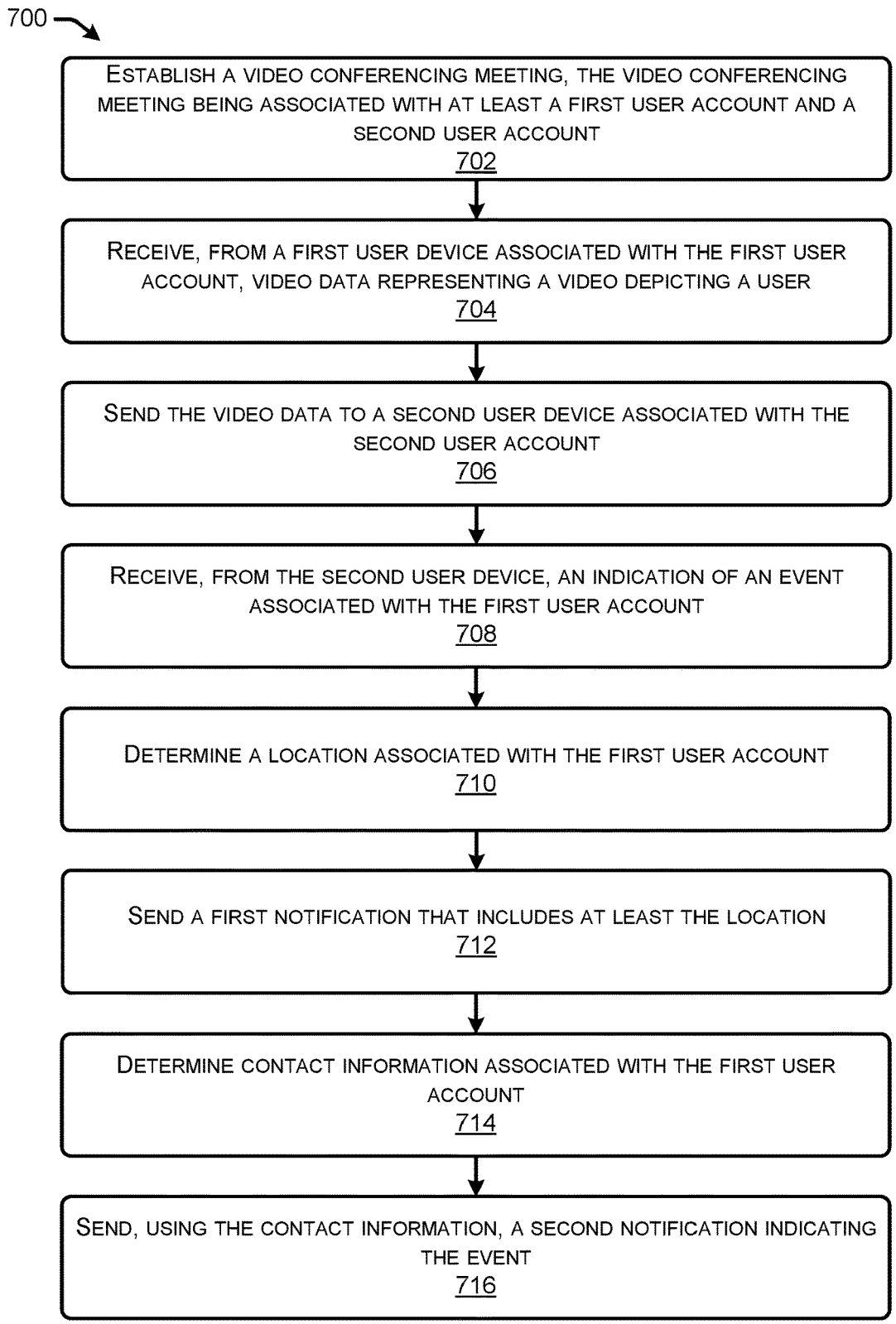
FIG. 7 illustrates a flow diagram of an example method for identifying an event during an online meeting and then providing notifications associated with the event, in accordance with present concepts.

FIG. 7 illustrates a flow diagram of an example method for identifying an event during a video conferencing meeting and then providing notifications associated with the event, in accordance with present concepts. An operation 702 represents establishing a video conferencing meeting, the video conferencing meeting being associated with at least a first user account and a second user account. For instance, the conferencing device(s) 110 may establish a first communication session associated with the first user account and a second communication session associated with the second user account. The conferencing device(s) 110 may then connect the first communication session with the second communication session in order to generate the video conferencing meeting. In some examples, the video conferencing meeting may be associated with more than just two user accounts.

An operation 704 represents receiving, from a first user device associated with the first user account, video data representing a video depicting a user and an operation 706 represents sending the video data to a second user device associated with the second user account. For instance, the conferencing device(s) 110 may be receiving and sending video data between at least the first user device and the second user device. In some instances, the conferencing device(s) 110 may provide the video as part of a user interface. For instance, the conferencing device(s) 110 may generate a user interface that includes at least a first area providing the video depicting the user, a second area providing an additional video depicting an additional user, and an interface element for indicating when an event occurs. The conferencing device(s) 110 may then send data representing the user interface to at least the second user device.

An operation 708 represents receiving, from the second user device, an indication of an event associated with the first user account. For instance, the conferencing device(s) 110 may receive, from the second user device, the indication of the event. In some examples, the conferencing device(s) 110 may receive the indication by receiving, from the second user device, input data representing a selection associated with the first user account (e.g., a selection of the first area providing the video) and a selection of the interface element. In some examples, the conferencing device(s) 110 may further receive, from the second user device, information associated with the event. The information may include, but is not limited to, the type of event, the location of the user that is experiencing the event, contact information associated with contact(s) of the user, and/or any other information.

An operation 710 represents determining a location associated with the first user account and an operation 712 represents sending a first notification that includes at least the location. For instance, the conferencing device(s) 110 may determine the location associated with the first user account. In some examples, the conferencing device(s) 110 may determine the location using the first user account, information received from one of the user devices, location data from the first user device, and/or network data received from the first user device. The conferencing device(s) 110 may then generate and send the first notification that includes at least the location. In some examples, the conferencing device(s) 110 send the first notification to one or more computing devices associated with emergency personnel. In some examples, the first notification may include additional information, such as the identity of the user, the type of event, and/or the like.

An operation 714 represents determining contact information associated with the first user account and an operation 716 represents sending, using the contact information, a second notification that indicates the event. For instance, the conferencing device(s) 110 may determine the contact information associated with the first user account. In some examples, the conferencing device(s) 110 determine the contact information using the first user account, information received from one or more of the user devices, and/or a directory. The conferencing device(s) 110 may then generate and send the second notification that indicates at least the event. In some examples, the second notification may include additional information, such as the identity of the user, the location of the user, the type of event, and/or the like.

Figure 8:
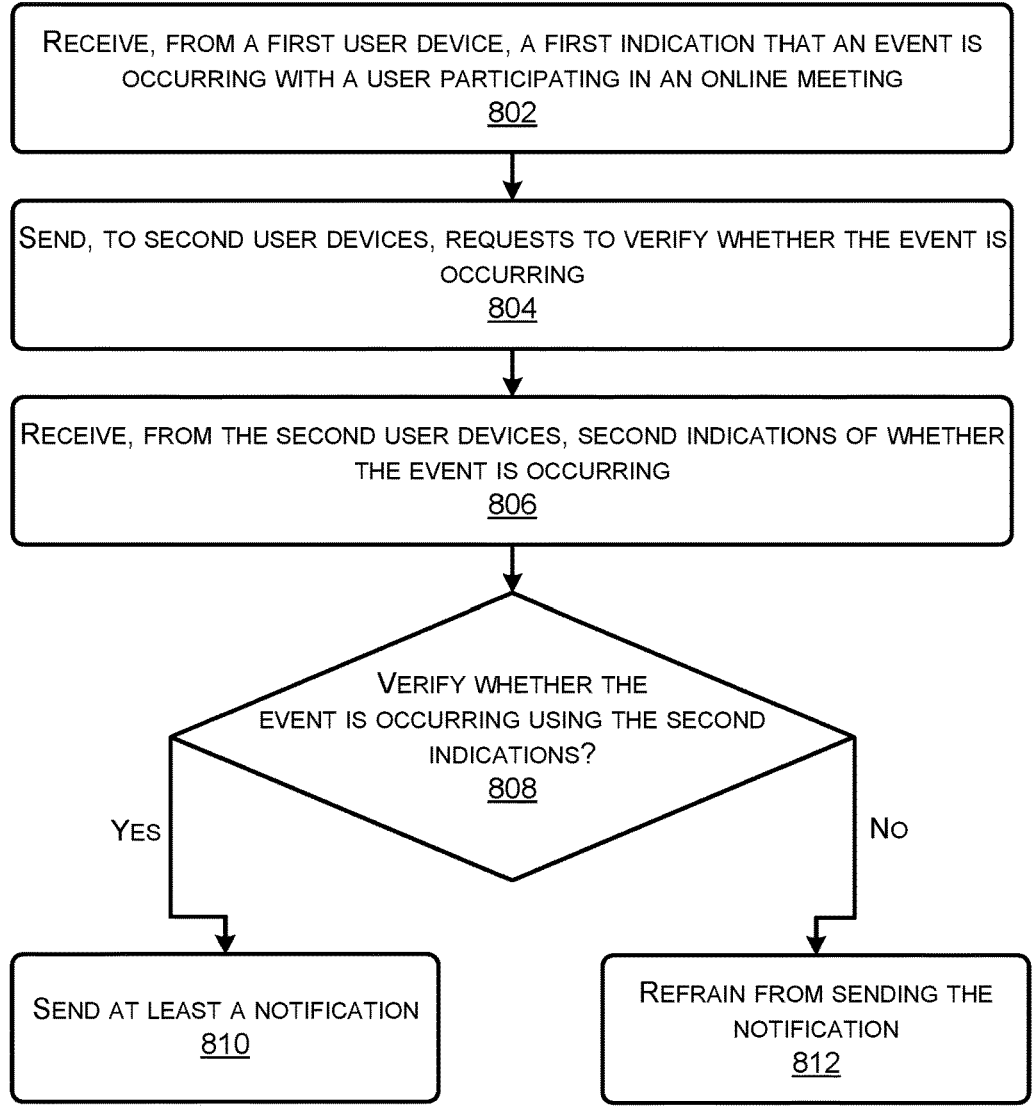
FIG. 8 illustrates a flow diagram of an example method for verifying whether an event is occurring during an online meeting, in accordance with present concepts.

FIG. 8 illustrates a flow diagram of an example method 800 for verifying whether an event is occurring during an online meeting, in accordance with present concepts. An operation 802 represents receiving, from a first user device, a first indication that an event is occurring with a user participating in an online meeting. For instance, the conferencing device(s) 110 may establish the online meeting, such as a video conferencing meeting, for users. During the online meeting, the conferencing device(s) 110 may communicate data, such as video data and audio data, between the user device connected to the online meeting. Additionally, the conferencing device(s) 110 may receive, from the first user device, the first indication of the event associated with the user.

An operation 804 represents sending, to second user devices, requests to verify whether the event is occurring and an operation 806 represents receiving, from the second user devices, second indications of whether the event is occurring. For instance, based on receiving the first indication, the conferencing device(s) 110 may send the requests to the second user devices. Users of the second user devices may then view the video of the user that may be experiencing the event and input whether the user is in fact experiencing the event into the second user devices. As such, the conferencing device(s) 110 may receive, from the second user devices, the second indications of whether the event is occurring.

An operation 808 represents verifying whether the event is occurring using the second indications. For instance, the conferencing device(s) 110 may use the second indications to verify whether the event is occurring. In some examples, the conferencing device(s) 110 may verify that the event is occurring when a given number of users indicate that the event is occurring, a threshold number of users indicate that the event is occurring, and/or a specific user indicates that the event is occurring. In some examples, the conferencing device(s) 110 may determine that the event is not occurring when a given number of users indicate that the event is not occurring, a threshold number of users indicate that the event is not occurring, and/or a specific user indicates that the event is not occurring.

If, at 808, it is verified that the event is occurring, then an operation 810 represents sending at least a notification. For instance, if the conferencing device(s) 110 verify that the event is occurring, then the conferencing device(s) 110 may send the notification to emergency personnel, a contact of the user, and/or the like. However, if, at 808, it is not verified that the event is occurring, then an operation 812 represents refraining from sending the notification. For instance, if the conferencing device(s) 110 do not verify that the event is occurring, then the conferencing device(s) 110 may refrain from sending the notification.

Figure 9:
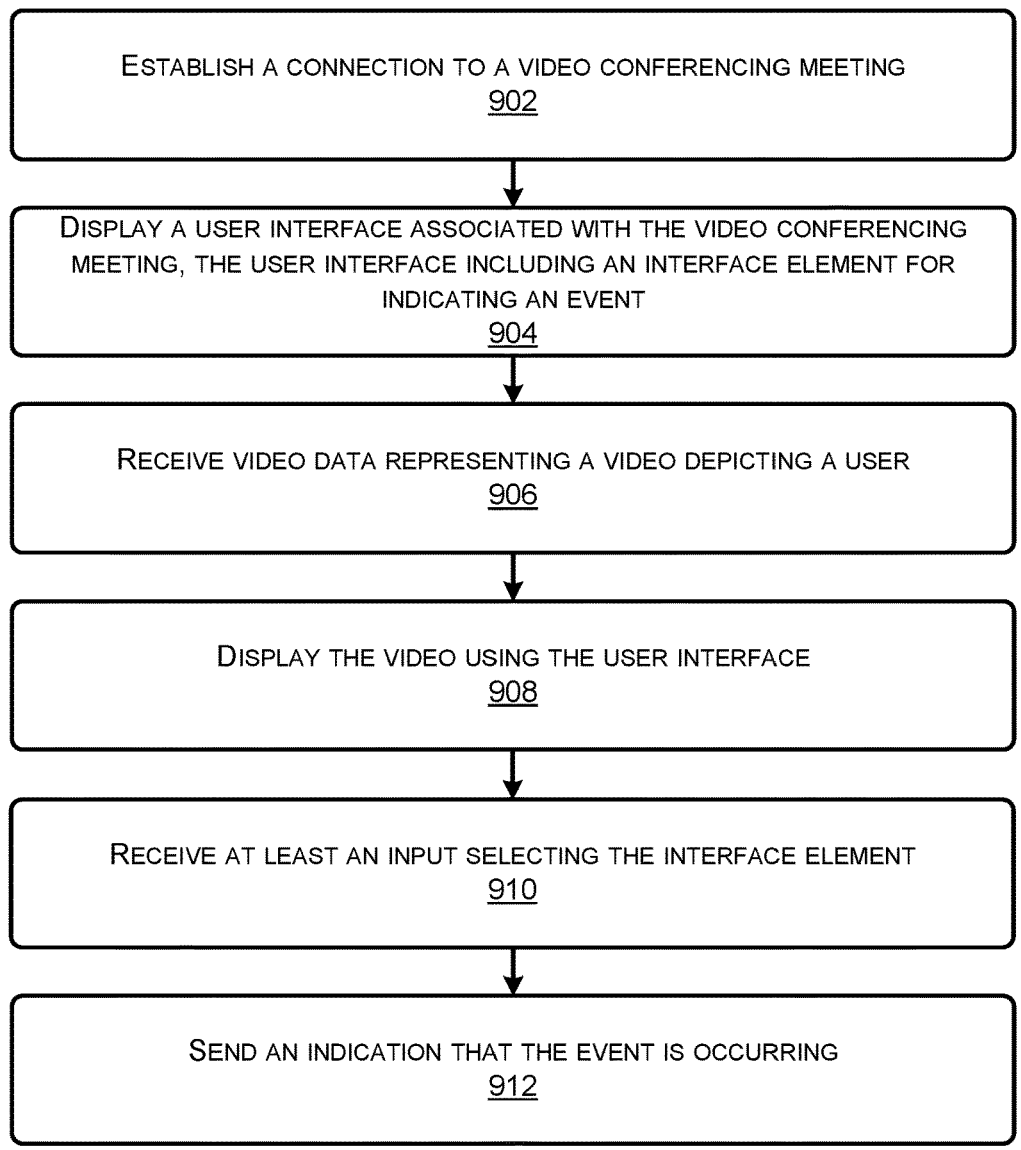
FIG. 9 illustrates a flow diagram of an example method for using a user interface to indicate that an event is occurring during an online meeting, in accordance with present concepts.

FIG. 9 illustrates a flow diagram of an example method for using a user interface to indicate that an event is occurring during a video conferencing meeting, in accordance with present concepts. An operation 902 represents establishing a connection to a video conferencing meeting and an operation 904 represents displaying a user interface associated with the video conferencing meeting, the user interface including an interface element for indicating an event. For instance, the user device 602 may establish the connection with the conferencing device(s) 110 that are hosting the video conferencing meeting. The user device 602 may also display the user interface that includes areas for providing videos depicting users included in the video conferencing meeting and the interface element for indicating the event.

An operation 906 represents receiving video data representing a video depicting a user and an operation 908 represents displaying the video using the user interface. For instance, the user device 602 may receive the video data from the conferencing device(s) 110. The user device 602 may then provide the video using an area of the user interface. Additionally, in some examples, the user device 602 may receive additional video data from the conferencing device(s) 110, where the additional video data represents additional video(s) depicting additional user(s). In such examples, the user device 602 may further provide the additional video(s) using additional area(s) of the user interface.

An operation 910 represents receiving at least an input selecting the interface element and an operation 912 represents sending an indication that the event is occurring. For instance, the user device 602 may receive at least a first input indicating the user, such as a first input selecting the area of the user interface that is providing the video, and a second input selecting the interface element. In some examples, the user device 602 may then determine that the event is occurring and send, to the conferencing device(s) 110, the indication that the event is occurring. In some examples, the user device 602 may send, to the conferencing device(s) 110, input data representing the input(s).

Figure 10:
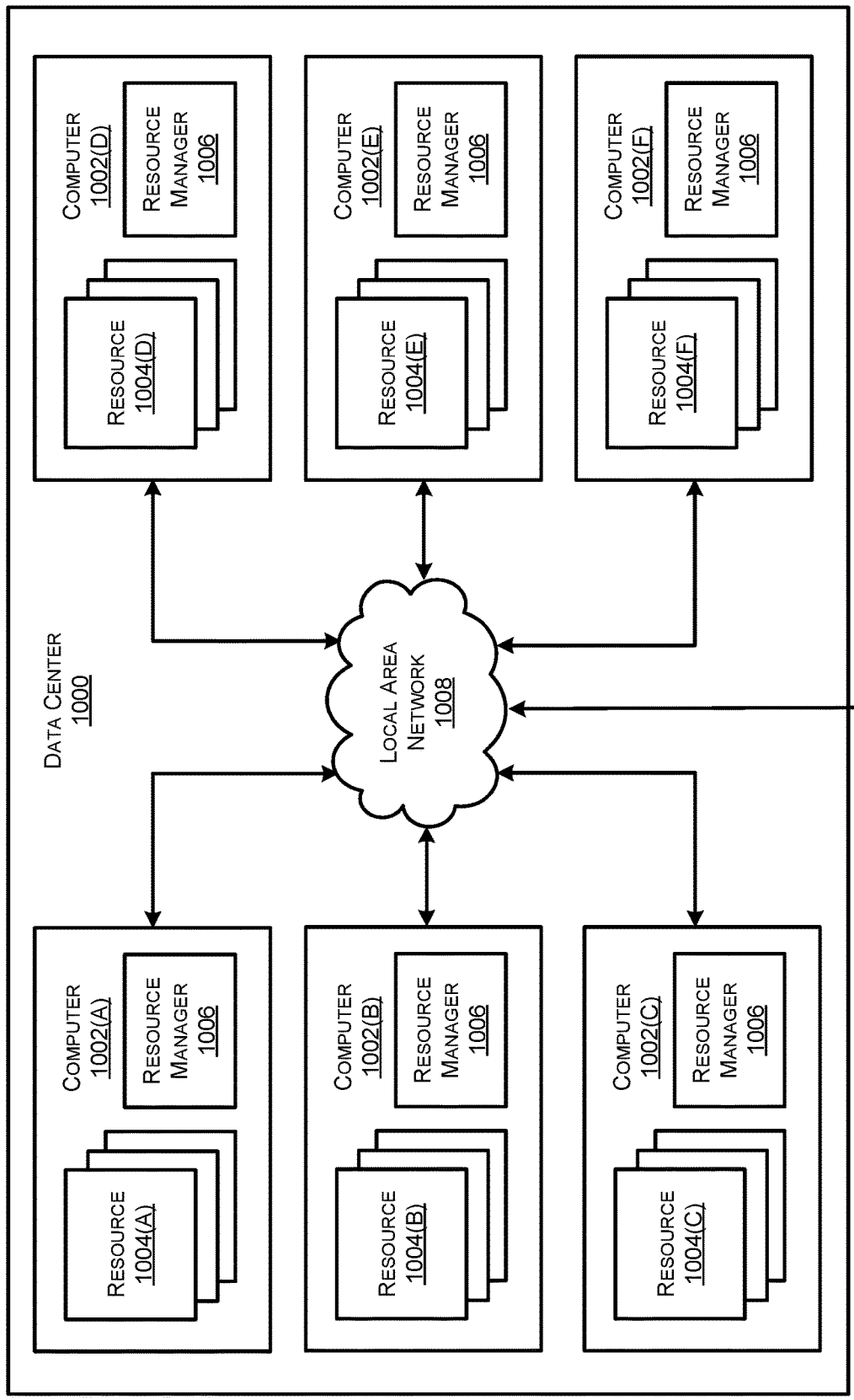
FIG. 10 illustrates a computing system diagram illustrating a configuration for a data center that can be utilized to implement aspects of the technologies disclosed herein.

FIG. 10 is a computing system diagram illustrating a configuration for a data center 1000 that can be utilized to implement aspects of the technologies disclosed herein. The example data center 1000 shown in FIG. 10 includes several computers 1002A-1002F (which might be referred to herein singularly as "a computer 1002" or in the plural as "the computers 1002") for providing computing resources. In some examples, the resources and/or computers 1002 may include, or correspond to, any type of networked device described herein, such as the authentication device(s) 108. Although, computers 1002 may comprise any type of networked device, such as servers, switches, routers, hubs, bridges, gateways, modems, repeaters, access points, hosts, etc.

The computers 1002 can be standard tower, rack-mount, or blade server computers configured appropriately for providing computing resources. In some examples, the computers 1002 may provide computing resources 1004 including data processing resources such as virtual machine (VM) instances or hardware computing systems, database clusters, computing clusters, storage clusters, data storage resources, database resources, networking resources, and others. Some of the computers 1002 can also be configured to execute a resource manager 1006 capable of instantiating and/or managing the computing resources. In the case of VM instances, for example, the resource manager 1006 can be a hypervisor or another type of program configured to enable the execution of multiple VM instances on a single computer 1002. Computers 1002 in the data center 1000 can also be configured to provide network services and other types of services.

In the example data center 1000 shown in FIG. 10, an appropriate local area network (LAN) 1008 is also utilized to interconnect the computers 1002A-1002F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between data centers 1000, between each of the computers 1002A-1002F in each data center 1000, and, potentially, between computing resources in each of the computers 1002. It should be merely illustrative and that other implementations can be utilized.

In some examples, the computers 1002 may each execute one or more application containers and/or virtual machines to perform techniques described herein. For instance, the containers and/or virtual machines may serve as server devices, user devices, and/or routers in the cloud computing network 102.

In some instances, the data center 1000 may provide computing resources, like application containers, VM instances, and storage, on a permanent or an as-needed basis. Among other types of functionality, the computing resources provided by a cloud computing network may be utilized to implement the various services and techniques described above. The computing resources 1004 provided by the cloud computing network can include various types of computing resources, such as data processing resources like application containers and VM instances, data storage resources, networking resources, data communication resources, network services, and the like.

Each type of computing resource 1004 provided by the cloud computing network can be general-purpose or can be available in a number of specific configurations. For example, data processing resources can be available as physical computers or VM instances in a number of different configurations. The VM instances can be configured to execute applications, including web servers, application servers, media servers, database servers, some or all of the network services described above, and/or other types of programs. Data storage resources can include file storage devices, block storage devices, and the like. The cloud computing network can also be configured to provide other types of computing resources 1004 not mentioned specifically herein.

The computing resources 1004 provided by a cloud computing network may be enabled in one embodiment by one or more data centers 1000 (which might be referred to herein singularly as "a data center 1000" or in the plural as "the data centers 1000"). The data centers 1000 are facilities utilized to house and operate computer systems and associated components. The data centers 1000 typically include redundant and backup power, communications, cooling, and security systems. The data centers 1000 can also be located in geographically disparate locations. One illustrative embodiment for a data center 1000 that can be utilized to implement the technologies disclosed herein will be described below with regard to FIG. 11.

Figure 11:
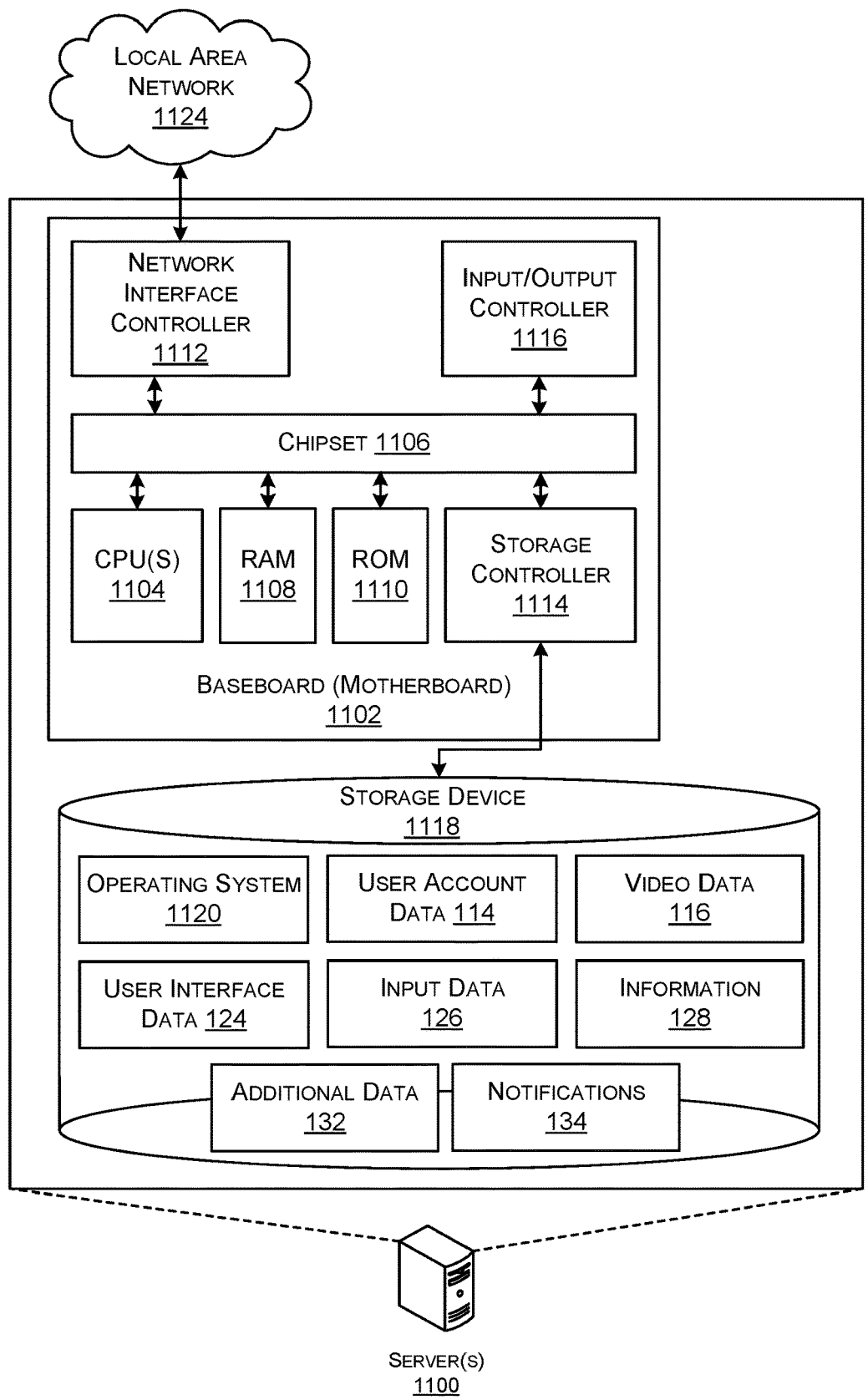
FIG. 11 is a computer architecture diagram showing an illustrative computer hardware architecture for implementing a server computing device that can be utilized to implement aspects of the various technologies presented herein.

FIG. 11 is a computer architecture diagram showing an illustrative computer hardware architecture for implementing a server computing device 1100 that can be utilized to implement aspects of the various technologies presented herein. The conferencing device(s) 110, discussed above, may include some or all of the components discussed below with reference to the server computing device 1100.

To begin, the server computer 1100 can be standard tower, rack-mount, or blade server computers configured appropriately for providing the computing resources described herein. As mentioned above, the computing resources provided by a cloud computing network, data center, or the like can be data processing resources such as VM instances or hardware computing systems, database clusters, computing clusters, storage clusters, data storage resources, database resources, networking resources, and others. Some of the servers 1100 can also be configured to execute a resource manager capable of instantiating and/or managing the computing resources. In the case of VM instances, for example, the resource manager can be a hypervisor or another type of program configured to enable the execution of multiple VM instances on a single server computer 1100. Server computers 1100 in a data center can also be configured to provide network services and other types of services.

The server computer 1100 includes a baseboard 1102, or "motherboard," which is a printed circuit board to which a multitude of components or devices can be connected by way of a system bus or other electrical communication paths. In one illustrative configuration, one or more central processing units (CPUs) 1104 operate in conjunction with a chipset 1106. The CPUs 1104 can be standard programmable processors that perform arithmetic and logical operations necessary for the operation of the computer 1100.

The CPUs 1104 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1106 provides an interface between the CPUs 1104 and the remainder of the components and devices on the baseboard 1102. The chipset 1106 can provide an interface to a RAM 1108, used as the main memory in the computer 1100. The chipset 1106 can further provide an interface to a computer-readable storage medium such as a read-only memory (ROM) 1110 or non-volatile RAM (NVRAM) for storing basic routines that help to startup the computer 1100 and to transfer information between the various components and devices. The ROM 1110 or NVRAM can also store other software components necessary for the operation of the computer 1100 in accordance with the configurations described herein.

The computer 1100 can operate in a networked environment using logical connections to remote computing devices and computer systems through a network, such as a local area network 1124. The chipset 1106 can include functionality for providing network connectivity through a Network Interface Card (NIC) 1112, such as a gigabit Ethernet adapter. The NIC 1112 is capable of connecting the computer 1100 to other computing devices over the network. It should be appreciated that multiple NICs 1112 can be present in the computer 1100, connecting the computer to other types of networks and remote computer systems.

The computer 1100 can be connected to a storage device 1118 that provides non-volatile storage for the computer. The storage device 1118 can store an operating system 1120, programs 1122, and data, which have been described in greater detail herein. The storage device 1118 can be connected to the computer 1100 through a storage controller 1114 connected to the chipset 1106. The storage device 1118 can consist of one or more physical storage units. The storage controller 1114 can interface with the physical storage units through a serial attached SCSI (SAS) interface, a serial advanced technology attachment (SATA) interface, an FC interface, or other type of interface for physically connecting and transferring data between computers and physical storage units.

The computer 1100 can store data on the storage device 1118 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 1118 is characterized as primary or secondary storage, and the like.

For example, the computer 1100 can store information to the storage device 1118 by issuing instructions through the storage controller 1114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1100 can further read information from the storage device 1118 by detecting the physical states or characteristics of one or more particular locations within the physical storage units.

In addition to the mass storage device 1118 described above, the computer 1100 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1100. In some examples, the operations performed by the computer 1100, and or any components included therein, may be supported by one or more devices similar to computer 1100.

By way of example, and not limitation, computer-readable storage media can include volatile and non-volatile, removable and non-removable media implemented in any method or technology. Computer-readable storage media includes, but is not limited to, RAM, ROM, erasable programmable ROM (EPROM), electrically-erasable programmable ROM (EEPROM), flash memory or other solid-state memory technology, compact disc ROM (CD-ROM), digital versatile disk (DVD), high definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 1118 can store an operating system 1120 utilized to control the operation of the computer 1100. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The storage device 1118 can store other system or application programs and data utilized by the computer 1100.

In one embodiment, the storage device 1118 or other computer-readable storage media is encoded with computer-executable instructions which, when loaded into the computer 1100, transform the computer from a general-purpose computing system into a special-purpose computer capable of implementing the embodiments described herein. These computer-executable instructions transform the computer 1100 by specifying how the CPUs 1104 transition between states, as described above. According to one embodiment, the computer 1100 has access to computer-readable storage media storing computer-executable instructions which, when executed by the computer 1100, perform the various processes described above with regard to FIGS. 3-5. The computer 1100 can also include computer-readable storage media having instructions stored thereupon for performing any of the other computer-implemented operations described herein.

The computer 1100 can also include one or more input/output controllers 1116 for receiving and processing input from a number of input devices, such as a keyboard, a mouse, a touchpad, a touch screen, an electronic stylus, or other type of input device. Similarly, an input/output controller 1116 can provide output to a display, such as a computer monitor, a flat-panel display, a digital projector, a printer, or other type of output device. It will be appreciated that the computer 1100 might not include all of the components shown in FIG. 11, can include other components that are not explicitly shown in FIG. 11, or might utilize an architecture completely different than that shown in FIG. 11.

The server computer 1100 may also store, in the storage device 1118, The user account data 114, the video data 116, the user interface data 124, the input data 126, the information 128, the additional data 132, and the notifications 134.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative of some embodiments that fall within the scope of the claims of the application.

What is claimed is:

1. A system comprising:
   one or more processors; and
   one or more non-transitory computer-readable media storing instructions that, when executed by the one or more processors, cause the system to perform operations comprising:
      establishing an online meeting, the online meeting being associated with at least a first user account and a second user account;
      receiving data from a first user device associated with the first user account;
      sending the data to a second user device associated with the second user account;
      receiving, from the second user device, an indication of an emergency event associated with the first user account; and
      based at least in part on receiving the indication, sending, to one or more computing devices, a notification that indicates that the emergency event is occurring.

2. The system as recited in claim 1, the operations further comprising:
   determining contact information associated with a contact; and
   sending, using the contact information, an additional notification that indicates that the emergency event is occurring.

3. The system as recited in claim 2, wherein the data is first data, and wherein determining the contact information associated with the contact comprises at least one of:
   determining that the contact information is associated with the first user account;
   receiving, from the second user device, second data representing the contact information;
   receiving, from a third user device associated with a third user account, third data representing the contact information; or
   determining that the contact information is associated with a directory.

4. The system as recited in claim 1, the operations further comprising:
   generating a user interface associated with the online meeting, the user interface including at least:
      an area for providing video represented by the data; and
      an interface element for activating the emergency event,
   and wherein receiving the indication of the emergency event comprises receiving, from the second user device, input data representing a selection of at least the interface element.

5. The system as recited in claim 1, wherein the online meeting is further associated with a third user account, and wherein the operations further comprise:
   receiving, from a third user device associated with the third user account, an additional indication of the emergency event associated with the first user account; and
   verifying that the emergency event is occurring based at least in part on the additional indication.

6. The system as recited in claim 1, the operations further comprising:
   determining a location associated with the first user account; and
   sending, to the one or more computing devices, an additional notification that indicates the location.

7. The system as recited in claim 6, wherein the data is first data, and wherein determining the location associated with the first user account comprises at least one of:
   receiving, from the second user device, second data representing the location;
   receiving, from a third user device associated with a third user account, third data representing the location;
   determining that the location is associated with the first user account;
   receiving fourth data generated by the first user device, the third data representing the location;
   receiving, from a fourth user device associated with the first user account, fifth data representing the location; or
   determining the location using network connection data generated by the first user device.

8. The system as recited in claim 1, the operations further comprising sending, to the first user device and based at least in part on the emergency event occurring, at least one of:
   image data representing one or more images indicating that the emergency event is occurring; or
   audio data representing sound indicating that the emergency event is occurring.

9. The system as recited in claim 1, the operations further comprising:
   receiving, from a third user device associated with emergency personnel, additional video data representing an additional video; and sending the additional video data to at least the first user device.

10. The system as recited in claim 1, wherein the data is video data representing a video.

11. A method comprising:
establishing an online meeting, the online meeting being associated with at least a first user account and a second user account;
receiving data from a first user device associated with the first user account;
sending the data to a second user device associated with the second user account;
receiving, from the second user device, an indication of an emergency event associated with the first user account;
determining contact information; and
based at least in part on receiving the indication, sending, using the contact information, a notification that indicates the emergency event.

12. The method as recited in claim 11, further comprising:
determining a location associated with the first user account; and
sending, to one or more computing devices associated with emergency personnel, an additional notification that indicates at least the location and the emergency event.

13. The method as recited in claim 11, wherein the data is first data, and wherein determining the contact information comprises at least one of:
determining that the contact information is associated with the first user account;
receiving, from the second user device, second data representing the contact information;
receiving, from a third user device associated with a third user account, third data representing the contact information; or
determining that the contact information is associated with a directory.

14. The method as recited in claim 11, further comprising:
generating a user interface associated with the online meeting, the user interface including at least:
an area for displaying video represented by the data; and
an interface element for activating the emergency event,
and wherein receiving the indication of the emergency event comprises receiving, from the second user device, input data representing a selection of the interface element.

15. The method as recited in claim 11, wherein the online meeting is further associated with a third user account, and wherein the method further comprises:
receiving, from a third user device associated with the third user account, an additional indication of the emergency event associated with the first user account; and
verifying that the emergency event is occurring based at least in part on the additional indication.

16. The method as recited in claim 11, further comprising:
determining a first location associated with the first user account;
determining a second location associated with a third user device;
determining that the second location associated with the third user device is proximate to the first location associated with the first user account; and
sending, to the third user device, at least one of:
image data representing one or more images indicating that the emergency event is occurring; or
audio data representing sound indicating that the emergency event is occurring.

17. The method as recited in claim 11, further comprising:
receiving, from at least one of the second user device or a third user device associated with a third user account, an additional indication of a type of the emergency event,
and wherein the notification further indicates the type of the emergency event.

18. An electronic device comprising:
a display;
one or more processors; and
one or more non-transitory computer-readable media storing instructions that, when executed by the one or more processors, cause the electronic device to perform operations comprising:
establishing a connection with a system hosting an online meeting;
displaying, using the display, a user interface associated with the online meeting, the user interface including at least:
an area for providing a video; and
an interface element for activating an emergency event;
receiving, from the system, video data representing the video;
displaying the video using the area of the user interface;
receiving an input selecting the interface element; and
based at least in part on receiving the input, sending, to the system, an indication of the emergency event.

19. The electronic device as recited in claim 18, the operations further comprising:
receiving an additional input selecting the area; and
based at least in part on receiving the additional input, sending, to the system, an additional indication that it is a user associated with the video that is experiencing the emergency event.

20. The electronic device as recited in claim 18, the operations further comprising:
receiving an additional input indicating information associated with the emergency event, the information including at least one of:
contact information;
a location; or
a type of the emergency event; and
sending the information to the system.

* * * * *